United States Patent
Kennedy (10) Patent No.: US 12,310,332 B2
(45) Date of Patent: May 27, 2025

(54) CALF NURSING CRADLE

(71) Applicant: Catherine A. Kennedy, Des Moines, NM (US)

(72) Inventor: Catherine A. Kennedy, Des Moines, NM (US)

(*) Notice: Subject to any disclaimer, the term of this patent is extended or adjusted under 35 U.S.C. 154(b) by 16 days.

(21) Appl. No.: 18/488,110

(22) Filed: Oct. 17, 2023

(65) Prior Publication Data

US 2024/0122160 A1    Apr. 18, 2024

Related U.S. Application Data (60) Provisional application No. 63/417,113, filed on Oct. 18, 2022.

(51) Int. Cl.
*A01K 15/04* (2006.01)

(52) U.S. Cl.
CPC ................... *A01K 15/04* (2013.01)

(58) Field of Classification Search
CPC ........ A61D 3/00; A01K 1/0613; A01K 15/00; A01K 15/04
See application file for complete search history.

(56) References Cited

U.S. PATENT DOCUMENTS

| | | | | |
|---|---|---|---|---|
| 2,172,178 A | * | 9/1939 | Rosenberg | A47C 16/00 135/69 |
| 2,473,947 A | * | 6/1949 | Hamstrom | B60N 2/62 248/354.1 |
| 3,092,079 A | * | 6/1963 | Strebel | A01K 13/00 119/757 |
| 3,120,836 A | * | 2/1964 | Brauning | A61D 3/00 269/329 |
| 4,003,341 A | * | 1/1977 | La Croix | A61D 3/00 119/756 |
| 4,449,481 A | | 5/1984 | Dear et al. | |
| 5,090,368 A | | 2/1992 | Berghoefer | |
| 5,289,801 A | * | 3/1994 | Burks | A61D 3/00 119/728 |
| 6,325,154 B1 | * | 12/2001 | Keeler | A01L 13/00 119/757 |
| D455,252 S | * | 4/2002 | Hagans, III | D3/200 |
| 6,477,986 B1 | | 11/2002 | Korjenic | |
| 6,848,512 B2 | * | 2/2005 | Keeler | A01L 11/00 168/44 |
| 7,334,643 B2 | * | 2/2008 | Keeler | F16M 11/046 119/757 |
| D596,417 S | * | 7/2009 | Bowen | D6/353 |

(Continued)

*Primary Examiner* — Yvonne R Abbott-Lewis
(74) *Attorney, Agent, or Firm* — Woodard, Emhardt, Henry, Reeves & Wagner, LLP (57) ABSTRACT

A livestock support device including a cradle portion, a telescoping support, and a tip resistant base. The cradle portion is configured to support an animal, such as a calf. In one example, the cradle portion includes a U-shaped frame configured to support a sling. The sling is configured to support the animal such that the weight of the animal is held by the support device. In some embodiments, the sling defines a cutout or opening to allow the navel or umbilical cord of an animal to position there and protrude through the sling, without contacting it or causing discomfort, irritation or injury to the animal. In one example, a length of the base is greater than a length of the cradle portion, such that the base extends past the cradle portion for stability during use.

20 Claims, 10 Drawing Sheets

(56) References Cited

U.S. PATENT DOCUMENTS

| | | | |
|---|---|---|---|
| 8,333,159 B2* | 12/2012 | Schroer | A61D 3/00 |
| | | | 119/753 |
| D862,914 S * | 10/2019 | Lenz | D6/349 |
| 10,555,613 B1* | 2/2020 | Harris | A47C 16/025 |
| 11,102,957 B2* | 8/2021 | Lee | A61D 3/00 |
| 2007/0079766 A1 | 4/2007 | Park | |
| 2016/0050879 A1 | 2/2016 | Schnell et al. | |

* cited by examiner

CALF NURSING CRADLE

BACKGROUND

Newborn livestock animals, such as calves, typically need to begin to nurse immediately or shortly after birth. The nursing process supplies colostrum to the newborn animal, which helps with its proper growth and health. Unfortunately, many heifers struggle to give birth naturally and require human intervention. Commonly, a calf is pulled out of the mother using chains and/or a "calf puller" as it is called. This device places a large amount of physical and mental stress on both the mother and the calf. As a result, many of those calves are unable to stand or walk properly directly after birth. Thus, the calf's ability to nurse from its mother is limited. As should be appreciated, without access to the colostrum a number of calves may not survive or are unable to reach maturity without health problems. For example, without access to colostrum calves struggle to develop a strong immune system, which is used to fight off disease.

Currently, ranchers attempt to solve this problem by physically moving and holding calves in a nursing position under their mothers after birth. For example, a rancher may lift a calf up if it cannot stand and position the teats of the heifer within the mouth of the calf to facilitate nursing. The rancher must then remain holding the calf until the nursing is complete, and must repeat this process any number of times until the calf is strong enough to stand and do so on its own. As should be appreciated, this is a time-consuming, difficult and potentially dangerous process for not only the rancher but also the calf and its mother.

Thus, there is a need for improvement in this field.

SUMMARY

A device is provided for supporting a new- or recently-born calf or one otherwise needing assistance during early nursing from its mother. In one embodiment, the device includes a "U"-shaped frame configured to hold a similar-shaped sling and supported via a single telescoping support mounted to a stable, tip resistant base. The sling is configured to support the midsection of the calf, and in one example has a length sufficient to support the entire calf from an area behind one or more front legs to an area in front of one or more rear legs. The sling includes a depth sufficient to retain a calf within the sling without being able to slip or maneuver out of the sling and possibly fall and hurt itself or the rancher. For example, the midsection of the calf rests within the sling such that one or more sides of the "U" shape rest against one or more sides of the calf and both support and restrict the overall movement of the calf. In another embodiment, the sling includes a cutout such as a circular and/or other pattern in a bottom of the sling. The cutout is configured to reduce pressure or irritation on the midsection of the calf in an area adjacent its navel or umbilical cord of the calf which may still be sensitive after birth.

The "U"-shaped sling is typically made from leather and/or a rubber or similar material designed to support the calf without causing undue abrasion or harm. In other embodiments, the sling may be made from fabric and/or other materials such as with flex or stretch as long as they provide support and meet the intended purpose. Typically, the sling is mounted to the "U"-shaped frame in any of many ways as long as it can be removed and replaced as needed. In various examples, the frame is made from metal such as many steel, aluminum, and/or other alloys or from other materials to support the weight of the calf and still be as light as possible to preserve mobility and ease of use.

The "U"-shaped frame is connected to the base via a telescoping support. In one example, the support is in the form of a pillar with one or more height adjustment presets. For example, a user may adjust the distance from the ground to the sling via these presets based on the individual size and height of the calf and its mother to best position the two for nursing.

The base is configured to support the device and calf during use. In one example, the base is designed to be stable and "tip resistant" and constructed to withstand the weight and movement of the calf without collapsing or tipping over. In another example, the base includes a width that is less than its length such that a user may straddle the calf and cradle without stepping on the base and/or falling in order to move the calf into position next to its mother to nurse. The length of the base may in turn be equal to or longer than the frame to prevent forward or rearward tipping of the cradle. In one embodiment, the base forms only a single point of contact with the ground to facilitate rigidity and balance of the device. In various examples, the base may be hexagonal, rectangular, circular, oval, polygonal or other shapes as long as they meet the intended purpose.

In assembly, the base, telescoping support, frame, and sling are typically connected via the use of one or more types of fasteners. In one example, the base, telescoping support, and frame are held together via welds. In other examples, screws, bolts, nails, adhesives, or other fasteners and techniques may be successfully used as well.

Finally, in an example of the method of using the support device, a newborn calf or one having trauma or other birthing issues or otherwise needing assistance is positioned within the sling of the device. For example, the sling contacts between the front and rear legs of the calf with the navel adjacent the cutout. The sling thereby supports the weight of the calf such that the calf does not have to stand or put weight on its legs and can focus on feeding when the cradle is moved into position adjacent one side of its mother by a farmhand, rancher, or other attendant.

Other objects and attendant advantages will be readily appreciated, as the same become better understood by reference to the following detailed description when considered in connection with the accompanying drawings.

DESCRIPTION OF THE ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the disclosure relates.

Figure 1:
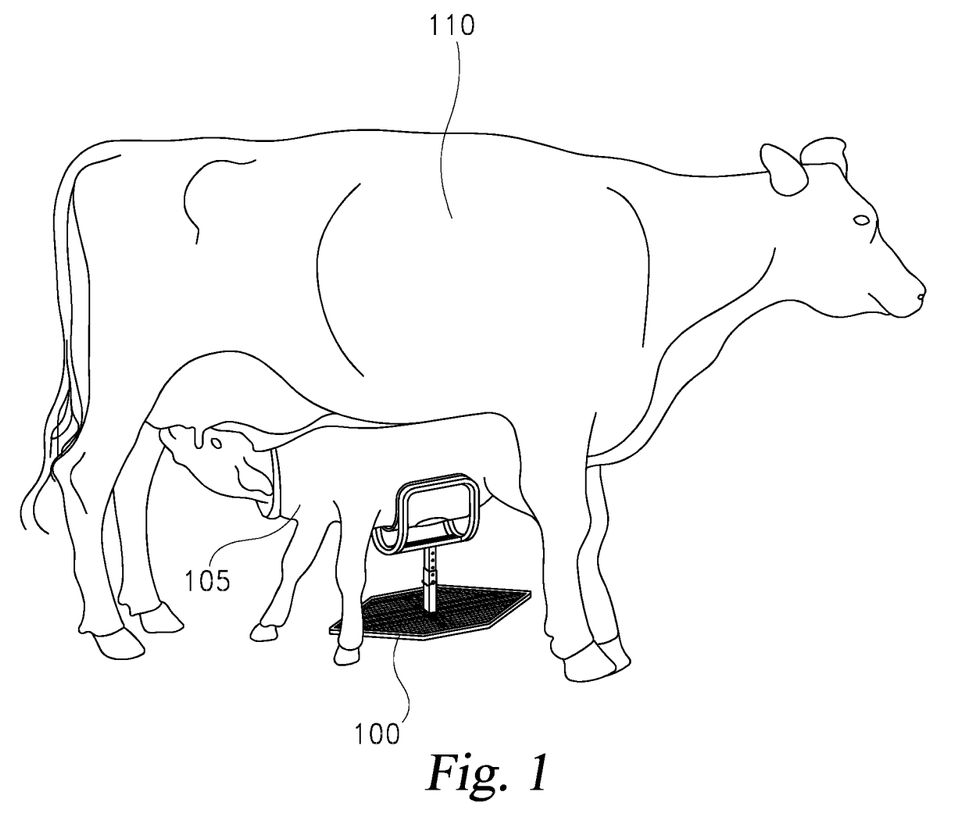
FIG. 1 is a side view of a livestock nursing process utilizing a livestock support device of the present disclosure.

FIG. 1 shows an example of a livestock support device 100 in use. The livestock support device 100 is configured to support an animal, such as a calf 105, that may be newborn and is weak, unable to stand, or otherwise needing assistance to nurse. The livestock support device 100 enables the animal to nurse without having to stand under its own power. In one example, a calf 105 is positioned adjacent one or more teats of a heifer 110 such that the livestock support device 100 supports the weight of the calf 105. The livestock support device 100 allows the calf 105 to simply focus on nursing, without the added complication of standing or physical limitations. As should be appreciated, the ability of newborn animals such as calves to nurse from their mothers is essential to their survival and the overall health and well-being of the animals. In one embodiment, the livestock support device 100 is configured for use with cows and their newborn calves. However, in other examples, the livestock support device 100 is able to be used with other animals such as horses, goats, and others. As should be appreciated, the device 100 may also be used to support animals during physical evaluations, medical procedures, and/or for other purposes.

Figure 2:
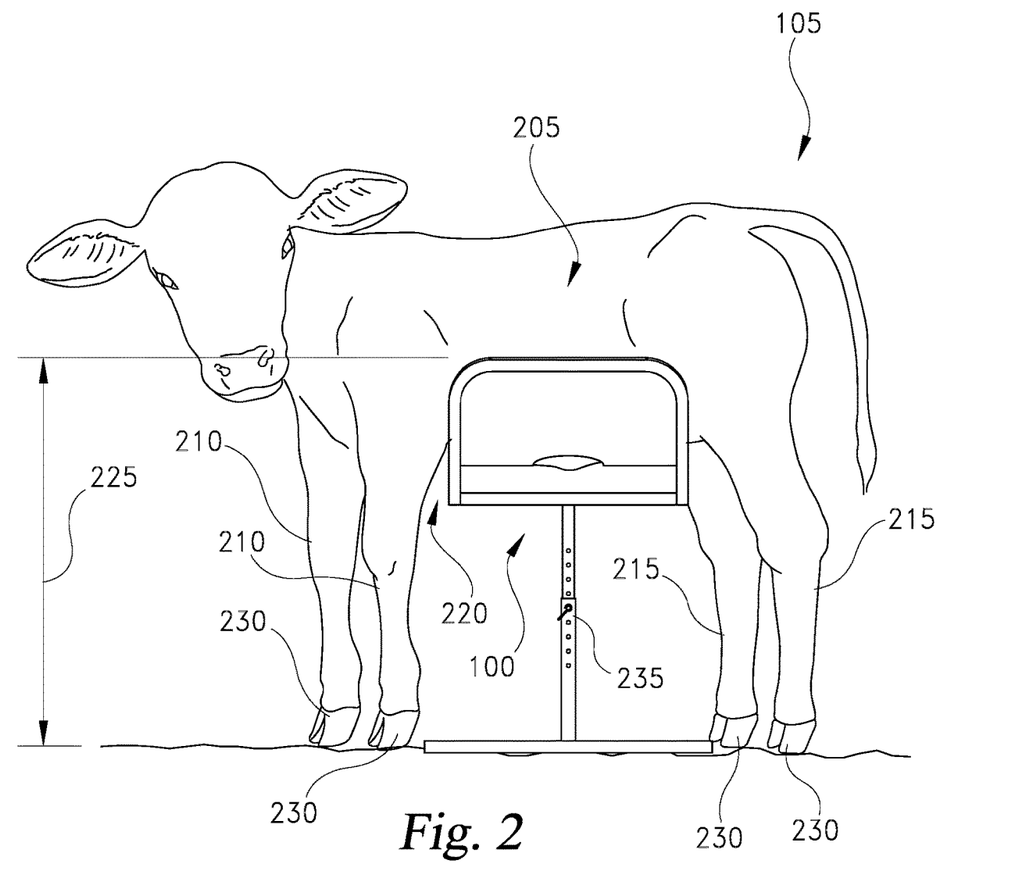
FIG. 2 is a side view of a calf held within the livestock support device of FIG. 1.

FIG. 2 shows an example of the calf 105 within the livestock support device 100. The calf 105 includes a midsection 205 extending from the back of one or more front legs 210 to the front of one or more rear legs 215. A cradle portion 220 of the livestock support device 100 is configured to surround a portion of the midsection 205 and support the calf 105. The cradle portion 220 is sized such that it extends from just behind the front legs 210 to just in front of the rear legs 215 to mitigate tipping or a loss of balance by the calf 105 when held in the livestock support device 100. In another example, the livestock support device 100 includes an adjustable height 225. In one example, the height 225 is adjusted so the calf 105 is positioned adjacent one or more teats of the mother depending on her size as well. In other examples, the height 225 of the livestock support device 100 may be adjusted such that one or more hooves 230 of the calf 105 are just touching or "floating" just above the ground when its legs are extended down. This configuration prevents undue weight or stress on the calf 105 as the livestock support device 100 holds a majority of the weight of the calf 105. It also encourages the calf 105 to use its legs and start putting weight on them to build up its strength for ultimately standing and walking on its own. In one embodiment, the height 225 is adjusted via a telescoping support 235. As will be discussed in more detail later, the telescoping support 235 includes one or more height adjustment presets. These presets allow a user to quickly adjust the height 225 of the livestock support device 100 up or down depending on the size and height of the calf 105 and also the height of its mother to allow for positions the calf close enough beside and under the heifer to nurse effectively.

In other embodiments, the livestock support device 100 may include one or more straps. The straps are configured to wrap over or around the animal to secure the animal within the cradle portion 220 so it does not struggle or wiggle around and possibly fall out. As should be appreciated, the size of the cradle portion 220 may be different based on the species and breed of animal involved. For example, the cradle portion 220 may be larger for horses and smaller for goats. However, in other embodiments the cradle portion 220 may be sized more as a one-size-fits-all for animals ranging from goats to horses. For example, that could be done by varying the adjustability and telescoping nature of the pedestal support 235 depending again on the general size of animal involved.

Figure 3:
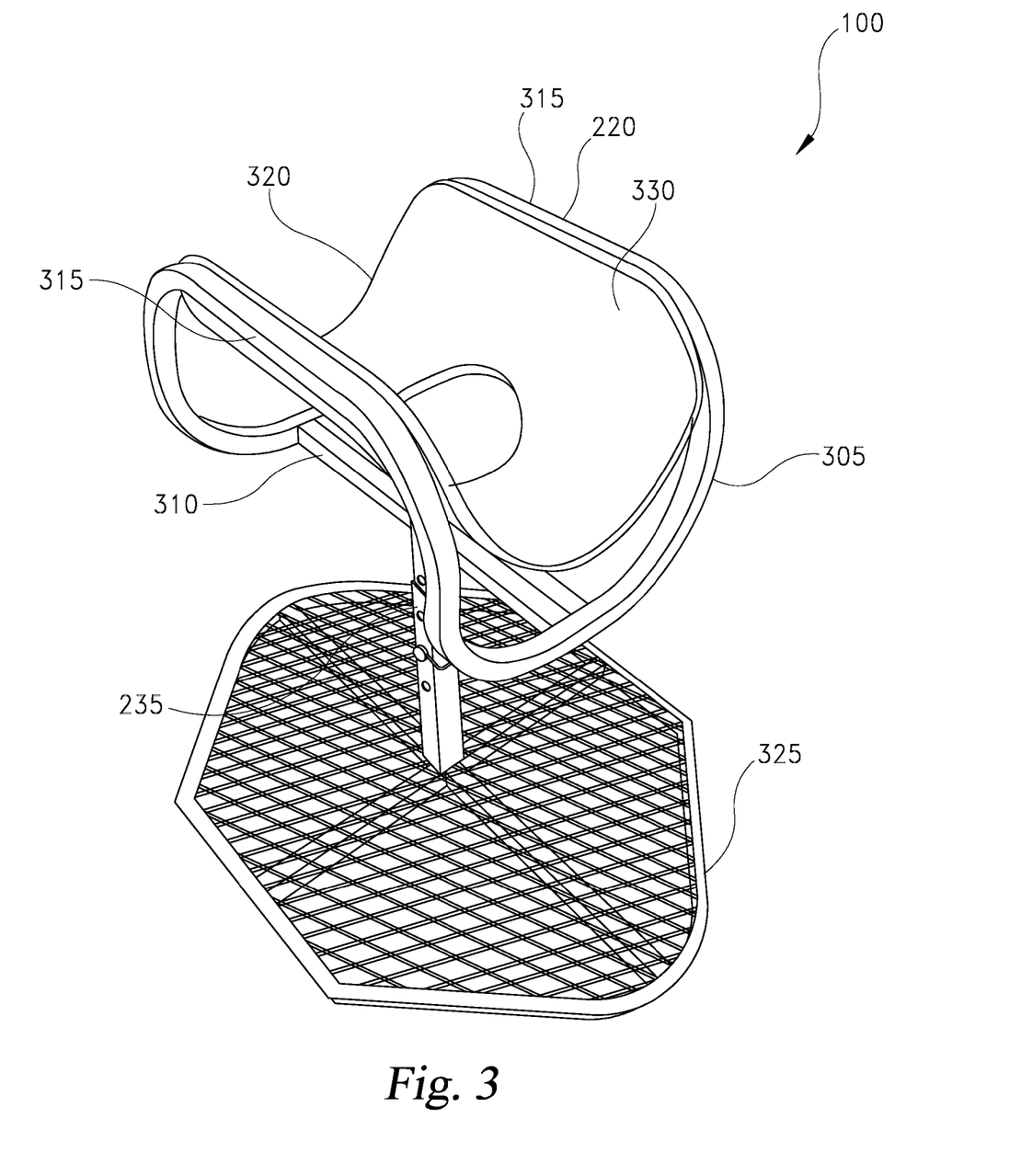
FIG. 3 is a perspective view of the livestock support device of FIG. 1.

FIG. 3 shows a perspective view of the livestock support device 100. The cradle portion 220 includes a substantially "U"-shaped frame 305. The frame 305 includes a cross-member 310 and one or more trusses 315 configured to supply strength and rigidity to the cradle portion 220. The cradle portion 220 further includes a sling 320 configured to support the calf 105 or other animal in need of assistance. The sling 320 is typically mounted to the trusses 315 of the frame 305. In one example, the sling 320 is mounted to the trusses 315 via one or more fasteners, such as screws, bolts, nuts, rivets, threads, adhesives, and/or other fasteners. The sling 320 is typically made from fabric, rubber, leather, and/or similar material to provide the support needed for the newborn animal without undue irritation or added stress. In some examples, the material includes the ability to flex or stretch to fully envelope the calf 105 within the sling 320. The sling 320 defines a U-shape configured to mitigate the risk of a calf 105 tipping over the device 100 or wiggling or struggling around and somehow falling out of the cradle portion 220. In one embodiment, the sling 320 includes one or more sides 330 configured to rest against the sides of the midsection 205 of the calf 105 to prevent the calf 105 from rocking, rolling or ultimately falling out of the livestock support device 100 and possibly injuring itself, the rancher or its mother. In some embodiments, the sides 330 of the sling 320 are different heights. For example, the sides 330 may be different heights to facilitate loading of a calf into the device from a particular side and/or position. In other embodiments, the sides 330 of the sling 320 are the same height.

The livestock support device 100 further includes a base 325 configured as a sturdy support and a tip resistant base for all general purposes and use. The base is "tip resistant" in that a length of the base 325 is such that the center of gravity of the device is shifted. As should be appreciated, tipping occurs when the center of gravity passes outside of the base, thus a base with a greater length is more difficult to tip over. The cradle portion 220 and base 325 are connected via the telescoping support 235. In one version, the telescoping support 235 is in the form of a single pillar configured to contact the cradle portion 220 and base 325 at only a single point. Thus, a single fixed point of contact or support exists between the cradle portion and the base. As should be appreciated, this configuration enables a rancher to more easily straddle the device, without interference from the support. In another version, the cradle portion 220 and the base 325 are connected via more than one telescoping support 235, such as two (2), three (3), four (4), and/or more supports. For example, two (2) telescoping supports 235 are arranged between the cradle portion 220 and the base 325. As should be appreciated, the use of additional supports adds additional strength and rigidity to the device 100. For example, more than one support may be used for larger animals, such as horses, large breed cows, and/or other large animals.

In one embodiment, the telescoping support 235, frame 305, and base 325 are made from a metal and/or metallic material. In one example, the support 235, frame 305, and/or base 325 are secured via one or more welds to enhance the structural integrity of the livestock support device 100. However, in other examples, the support 235, frame 305, and/or base 325 are held together via one or more of many possible fasteners as described previously.

Figure 4:
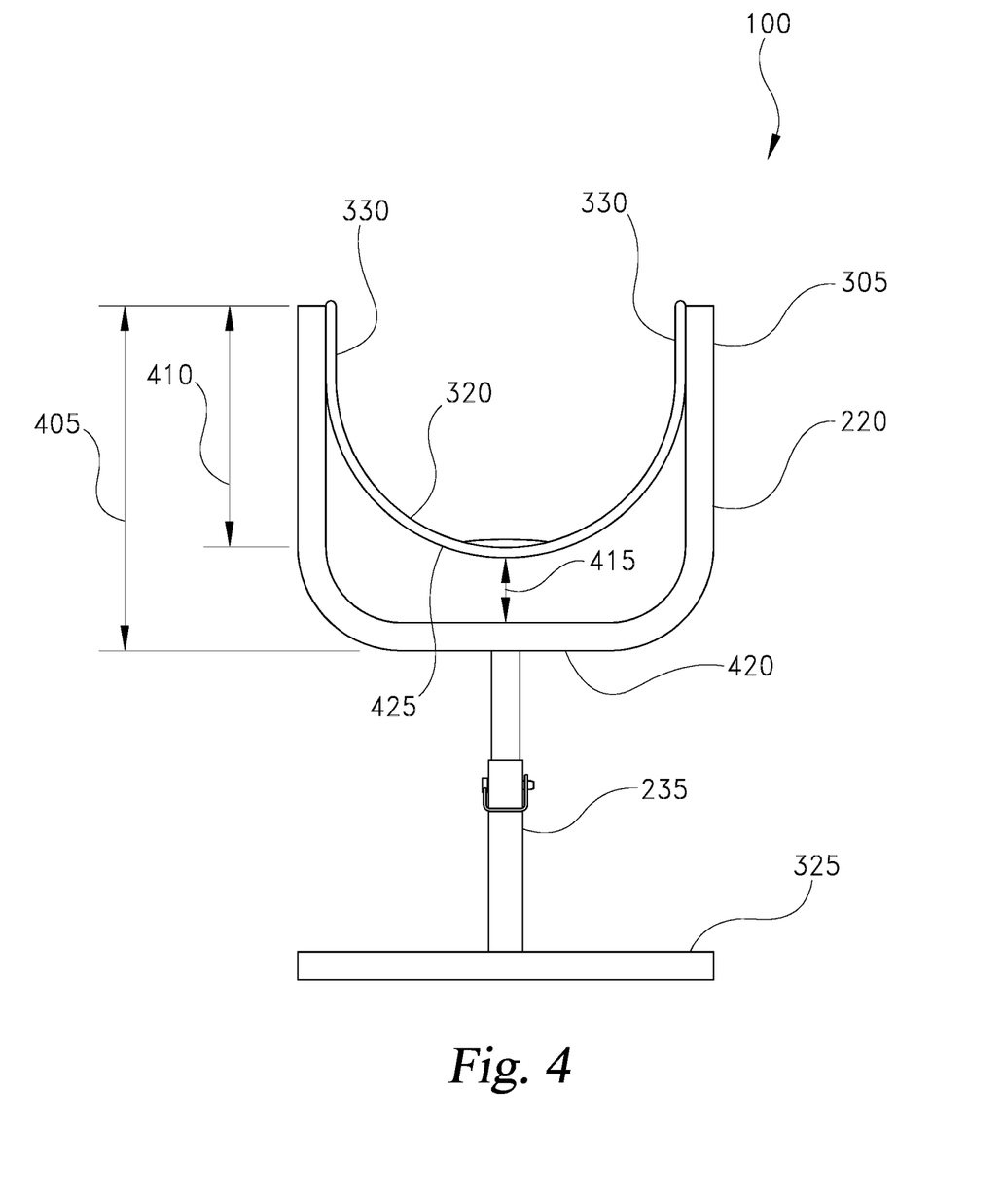
FIG. 4 is a front view of the livestock support device of FIG. 1.

As illustrated in FIG. 4, the frame 305 includes a depth 405 and the sling 320 includes a depth 410. Typically, the depth 410 of the sling 320 is less than the depth 405 of the frame 305 such that a gap 415 is formed between a valley 420 of the frame 305 and a bottom 425 of the sling 320. In one example, the gap 415 allows for the sling 320 to stretch and move, such that the sling 320 is supportive of the calf 105 but does not contact or rest on the frame 305. As should be appreciated, this configuration increases the comfort of the calf 105 when held in the livestock support device 100 during its intended use.

Figure 5:
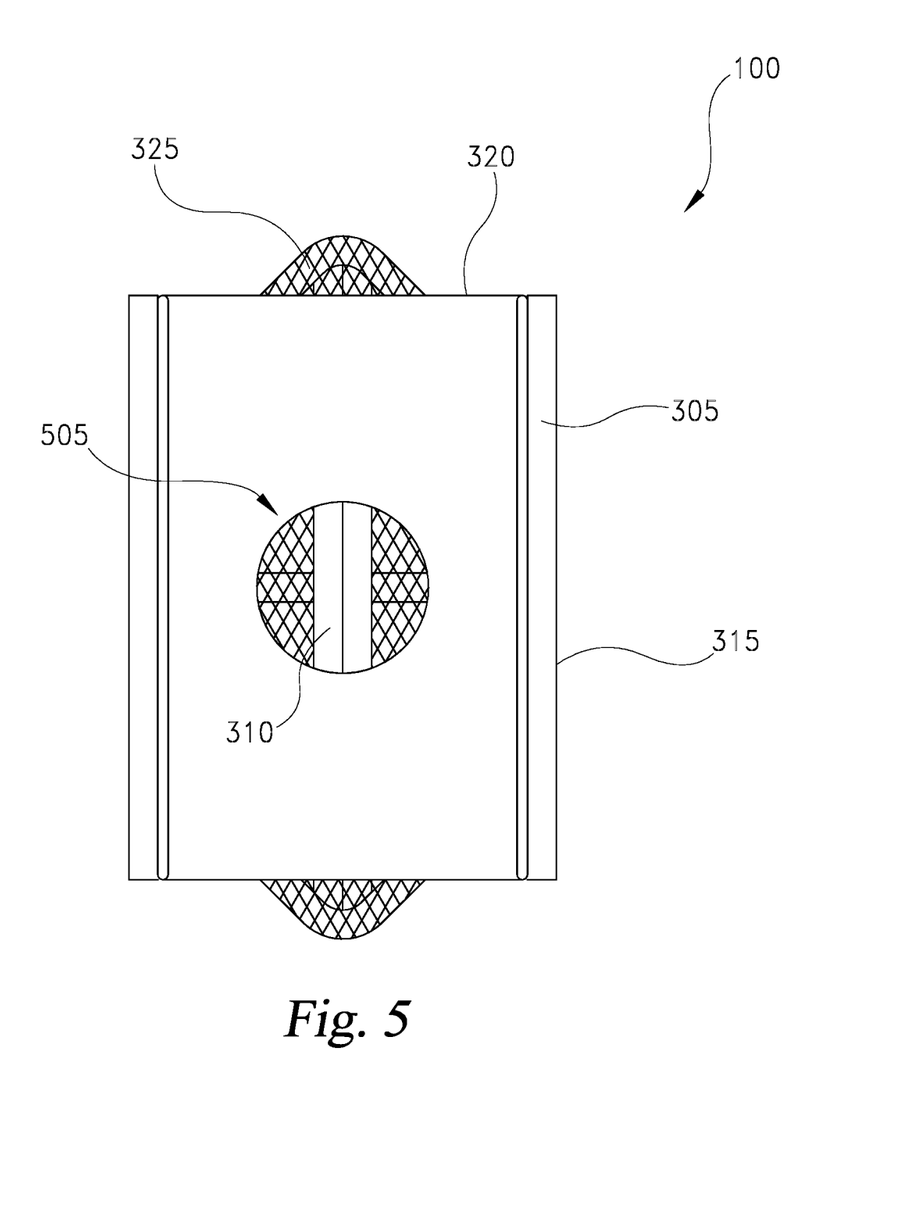
FIG. 5 is a top view of the livestock support device of FIG. 1.

As illustrated in FIG. 5, the sling 320 includes an opening or cutout 505. The cutout 505 is configured to allow a navel or umbilical cord area of the calf 105 to protrude into the opening and possibly through the sling 320 to prevent unnecessary chafing, discomfort, or injury to the calf 105. In one example, the cutout 505 defines a circular shape. However, in other examples, the cutout 505 defines other shapes, such as rectangular, oval, hexagonal, or other polygonal or even random shapes. Typically, the cutout 505 is positioned in the center of the sling 320 for a balanced weight distribution within the livestock support device 100. However, in other examples, the cutout 505 may be positioned in other areas of the sling 320. For example, the cutout 505 may be oriented towards either end of the sling 320 to accommodate animals with different physical characteristics, for example, see FIG. 9.

Figure 6:
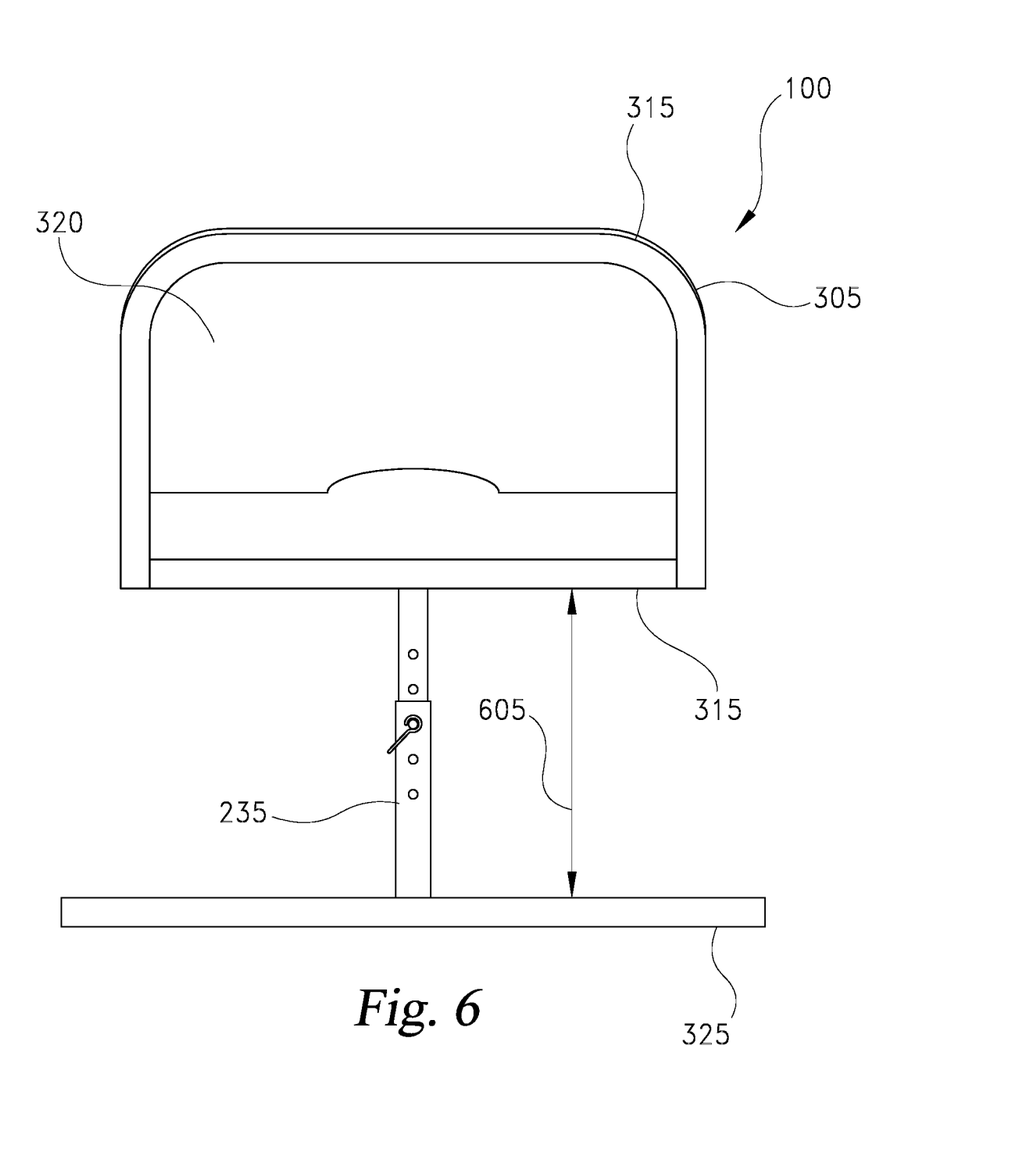
FIG. 6 is a side view of the livestock support device of FIG. 1.

As shown in FIG. 6, the telescoping support 235 includes an adjustable height 605. As should be appreciated, adjusting the height 605 of the telescoping support 235 correspondingly adjusts the height 225 of the livestock support device 100 as shown in FIG. 2. In one example, the height 605 of the telescoping support 235 is adjusted in order to accommodate animals of varying sizes and/or heights. In another example, the height 605 of the telescoping support 235 is adjusted to properly align a nursing animal with the teats of a mother. In yet another example, the height 605 of the telescoping support 235 is adjusted such that the sling 320 of the livestock support device 100 supports a majority of the weight of the animal when in use. In another example, the telescoping support 235 is configured such that the calf is positioned with the hooves "floating" just above the ground. As should be appreciated, this configuration encourages the calf to put a small amount of weight onto its legs to facilitate strength and coordination increases.

Figure 7:
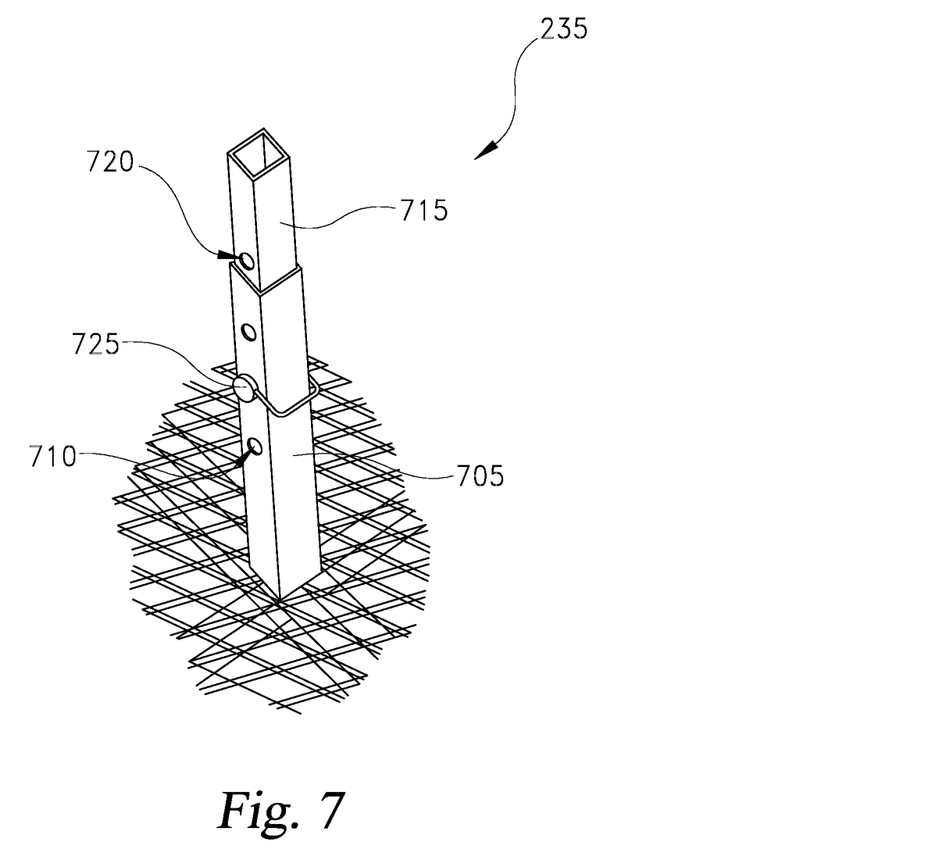
FIG. 7 is a perspective view of a telescoping support of the livestock support device of FIG. 1.

A portion of the livestock support device 100 depicting one embodiment of the telescoping support 235 is shown in FIG. 7. In one example, the telescoping support 235 is fixed at a first end to the crossmember 310. In another example, the telescoping support 235 is fixed at a second end to the base 325. Thus, the support forms a single, unitary support between the cradle portion and the base. As shown, the telescoping support 235 includes an outer support 705 with one or more outer height adjustment presets 710 and an inner support 715 with one or more inner height adjustment presets 720. In an example of use, the pin 725 is adjusted within the outer support 705 to align the outer height adjustment presets 710 of the outer support 705 with the inner height adjustment presets 720 of the inner support 715. Once a desired height 605 is reached, a pin 725 is positioned through the outer support 705 and inner support 715 via the outer height adjustment presets 710 and inner height adjustment presets 720. As should be appreciated, the pin 725 locks the outer support 705 and inner support 715 into position at the desired height 605. To adjust the height 605, a user removes the pin 725 from the outer height adjustment presets 710 and inner height adjustment presets 720, which enables movement of the inner support 715 within the outer support 705.

Figure 8:
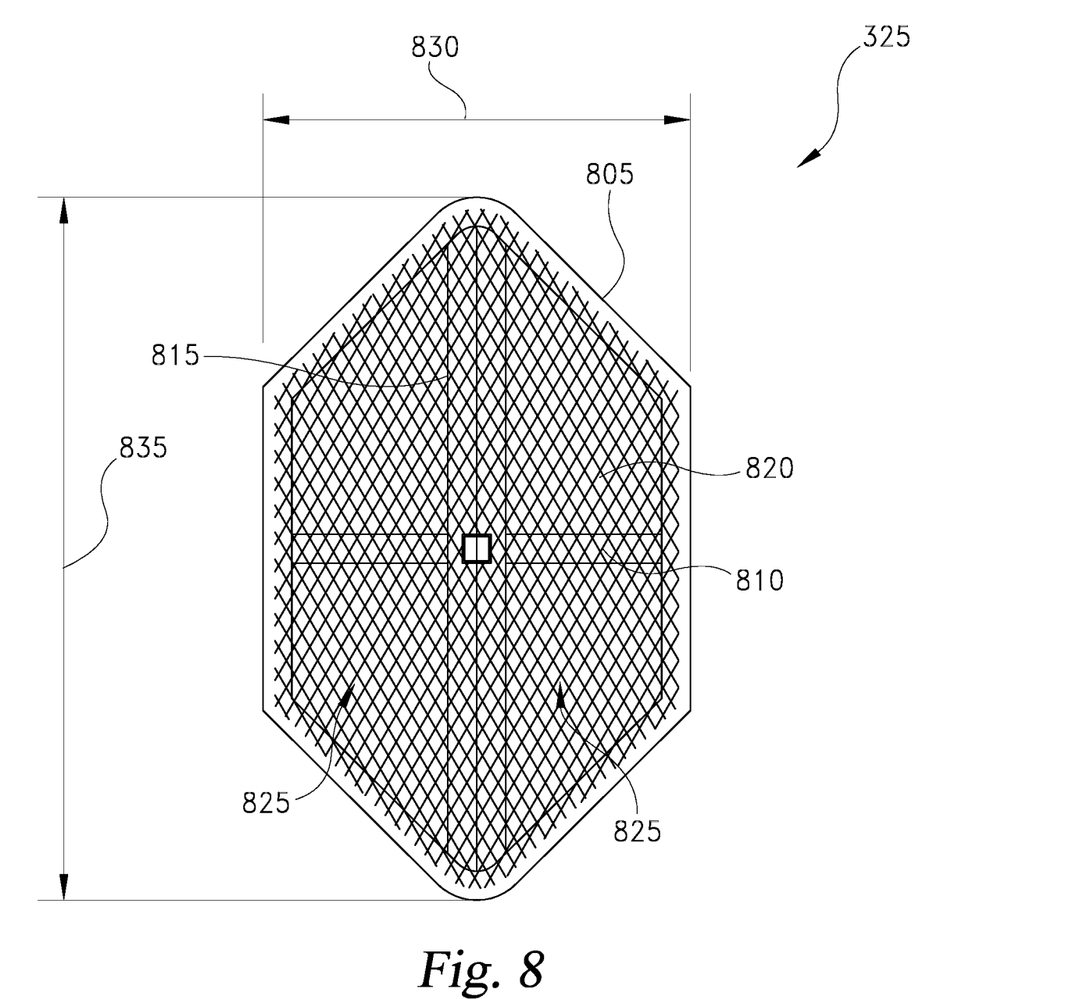
FIG. 8 is a top view of a base of the livestock support device of FIG. 1.

As illustrated in FIG. 8, one embodiment of the base 325 includes a foundation or frame 805. The foundation 805 further includes one or more joists 810 and one or more beams 815. In one example, the base 325 defines a hexagonal shape. However, in other examples, the base 325 may define other shapes, such as circular, oval, rectangular, or other polygonal shapes. In one embodiment, the base 325 includes a support surface 820 which may be solid or defining one or more or an overall pattern of holes 825. The support surface 820 provides a stable surface for a rancher or animal to stand on and support the device. It may also be beneficial if the holes 825 are configured to allow water, dirt, feces, or other objects or material depending on size to pass through the support surface 820 onto the ground.

The base 325 further includes a width 830 and a length 835. In one embodiment, the width 830 of the base 325 is smaller than the length 835 of the base. As will be discussed with greater detail in FIGS. 9 and 10, the width 830 of the base 325 is generally designed approximately equal to a width of the cradle portion 220. However, in other examples, the width 830 is larger or smaller than the width of the cradle portion 220. Correspondingly, the length 835 of the base 325 is configured to protrude past the cradle portion 220, such that the length 835 is longer than the cradle portion 220. However, in other embodiments, the length 835 is equal to or shorter than the cradle portion 220. As should be appreciated, this configuration prevents against forward or rearward tipping of the livestock support device 100 as a result of the forward or rearward weight distribution of the calf 105 or its general moving around in the device when it is used. For example, the extended length 835 of the base 325 increases the support area of the base 835. As mentioned previously, the center of gravity of the device must pass beyond the edge of the base to facilitate "tipping." Thus, extending the length 835 of the base 325 reduces the likelihood of the device tipping over forwards or rearwards.

Figure 9:
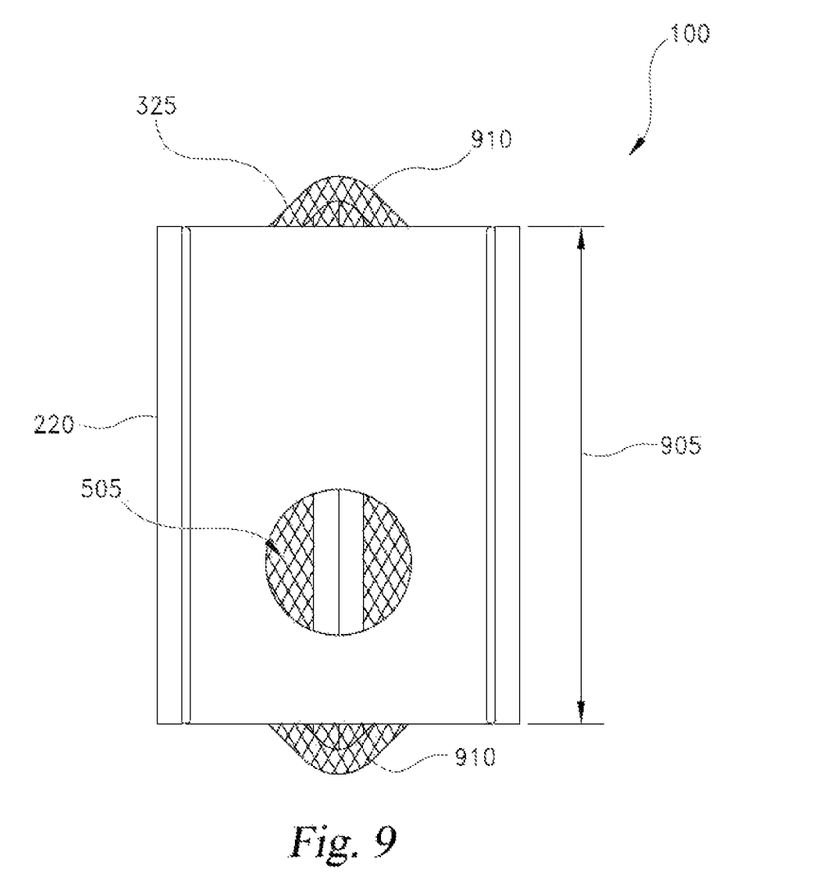
FIG. 9 is a top view of the livestock support device of FIG. 1.

FIG. 9 shows an example arrangement of the cradle portion 220 and the base 325 from a top view. As mentioned previously, the cradle portion 220 includes a length 905. In one example, the length 905 of the cradle portion 220 is sized to fit between the front legs 210 and rear legs 215 of the calf 105. However, as weight distribution of the calf 105 stretches beyond the cradle portion 220 (e.g. to the front or rear of the cradle portion 220), the base 325 is longer than the cradle portion 220 and remains stable in that way. Put differently, the length 835 of the base 325 is longer than the length 905 of the cradle portion 220 such that one or more noses or ends 910 of the base 325 may protrude past the cradle portion 220 to again add stability to the device and prevent the center of gravity from passing beyond the base 325.

Figure 10:
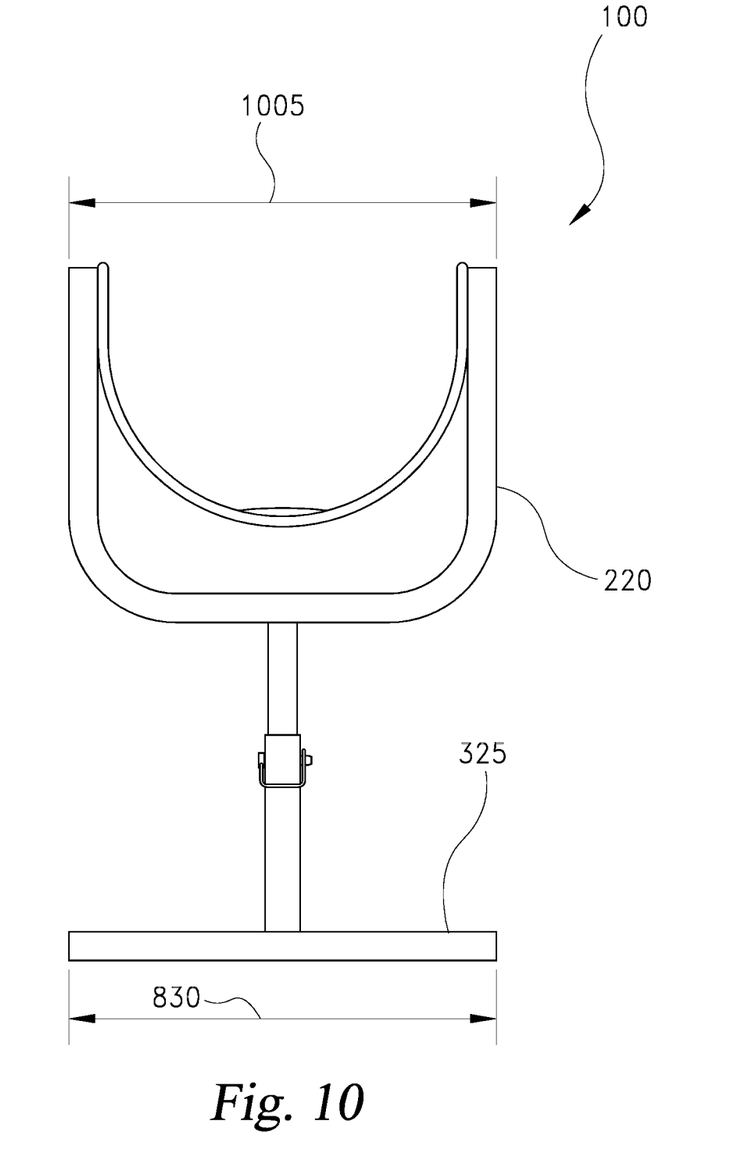
FIG. 10 is a front view of the livestock support device of FIG. 1.

FIG. 10 shows an example arrangement of the cradle portion 220 and the base 325 from a front view. As mentioned previously, a width 1005 of the cradle portion 220 is sized to accommodate a calf 105 such that the calf 105 is secured during positioning the calf adjacent and under its mother for nursing without being able to wiggle or thrash around and possible injure itself or anyone else. For example, the width 1005 is designed such that the sides 330 are located adjacent one or more sides of the calf. This configuration maintains the calf in an upright position, without the ability to rotate within the device. In one example, the width 830 of the base 325 and the width 1005 of the cradle portion 220 are equal. For example, the width 830 of the base 325 and the width 1005 of the cradle portion 220 shown here are substantially equal or similar enough so that a rancher or farmhand is able to straddle the livestock support device 100 when placing the calf in it and still have his or her feet stable on the ground. The rancher is thereby able to straddle the livestock support device 100 and move it around, such as when placing a calf in the cradle portion 220 and moving it adjacent the mother, and still have his or her feet positioned securely and safely on the ground. As should be appreciated, this configuration reduces the risk of tripping on the base 325 or having it interfere with the nursing process. In other embodiments, the width 830 of the base 325 is longer than the width 1005 of the cradle portion 220 so as to provide a more study base or may even be shorter so long as the necessary stability and ease of movement and us are maintained.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

The invention claimed is:

1. A livestock support device, comprising:
   a base, wherein the base has a length and a width, and wherein the length of the base is larger than the width of the base;
   a cradle portion, wherein the cradle portion has a length and a width;
   at least one telescoping support, wherein the telescoping support includes an adjustable height, and wherein the telescoping support is configured to secure the cradle portion to the base;
   wherein the cradle portion includes a frame configured to support a U-shaped sling, and wherein the sling is configured to support the weight of a livestock animal during nursing;
   wherein the width of the base is at least equal to the width of the cradle portion; and
   wherein the length of the base is longer than the length of the cradle portion; and
   wherein the sling includes a cutout configured to enable a navel of the animal to rest within the sling without contacting the sling.

2. The livestock support device of claim 1, wherein said cutout is positioned off-center on said sling.

3. The livestock support device of claim 1, wherein an area between a bottom of the sling and a valley of the frame defines a gap, and wherein the sling is configured to stretch into the gap when supporting an animal.

4. The livestock support device of claim 1, wherein the height of the support is adjusted via one or more height adjustment presets, and wherein the height is adjusted to align the animal with a nursing position.

5. The livestock support device of claim 1, wherein the base defines a hexagonal shape.

6. The livestock support device of claim 1, wherein the base includes a support surface defining one or more holes, and wherein the holes are configured to enable debris to pass-though the support surface.

7. The livestock support device of claim 1, wherein the base forms a single point of contact with the ground.

8. The livestock support device of claim 1, wherein the width of the base is equal to the width of the cradle portion.

9. A livestock support device, comprising:
   a base, wherein the base has a length and a width, and wherein the length of the base is larger than the width of the base;
   a cradle portion, wherein the cradle portion has a length and a width; and
   at least one telescoping support, wherein the telescoping support includes an adjustable height, and wherein the telescoping support is configured to secure the cradle portion to the base;
   wherein the cradle portion defines a U shape configured to receive and support a livestock animal;
   wherein the cradle portion includes a sling configured to support the weight of the animal; and
   wherein the sling includes an opening located adjacent a navel of the animal configured to enable the navel to rest within the sling without contacting the sling.

10. The livestock support device of claim 9, wherein the cradle portion includes a U-shaped frame configured to support the U-shaped sling.

11. The livestock support device of claim 9, wherein the cradle portion includes one or more sides configured abut one or more sides of the animal to retain the animal within the cradle portion during nursing.

12. The livestock support device of claim 11, wherein the length of the cradle portion is sized to extend from just in front of one or more rear legs of an animal to just behind one or more front legs of an animal when the animal is held within the cradle portion during nursing.

13. The livestock support device of claim 9, wherein the height of the support is adjusted via one or more height adjustment presets, and wherein the height is adjusted to align the animal with a nursing position.

14. The livestock support device of claim 9, wherein the base defines a hexagonal shape.

15. The livestock support device of claim 9, wherein the base includes a support surface defining one or more holes, and wherein the holes are configured to enable debris to pass-though the support surface.

16. The livestock support device of claim 9, wherein an area between a bottom of the sling and a valley of the frame defines a gap, and wherein the sling is configured to stretch into the gap when supporting an animal.

17. The livestock support device of claim 9, wherein the base forms a single point of contact with the ground.

18. The livestock support device of claim 9, wherein a single telescoping support secures the cradle portion to the base.

19. An animal support device, comprising:
   a base;
   a cradle portion;
   at least one support, wherein the support is configured to secure the cradle portion to the base;
   wherein the cradle portion includes a sling configured to support the weight of an animal; and wherein the sling includes an opening configured to enable the navel of the animal to be positioned within the opening when the animal is supported by the sling.

20. The animal support device of claim 19, wherein said cradle portion includes a frame and said frame supports said sling.

\* \* \* \* \*